United States Patent [19]

Brombach

[11] Patent Number: 5,044,394
[45] Date of Patent: Sep. 3, 1991

[54] APPARATUS FOR REGULATING AM OUTFLOW

[76] Inventor: Hansjörg Brombach, Von-Berlichingen-Str. 21, D-6990 Bad Mergentheim-Neunkirchen, Fed. Rep. of Germany

[21] Appl. No.: 507,021

[22] Filed: Apr. 9, 1990

[30] Foreign Application Priority Data

Apr. 15, 1989 [DE] Fed. Rep. of Germany ....... 3912436

[51] Int. Cl.⁵ .............................................. G05D 7/01
[52] U.S. Cl. ..................................... 137/486; 137/499
[58] Field of Search .............................. 137/499, 486

[56] References Cited

U.S. PATENT DOCUMENTS 3,225,785 12/1965 Goike .................................. 137/486
3,279,496 10/1966 Klass .................................. 137/499 X

FOREIGN PATENT DOCUMENTS 2643029 3/1978 Fed. Rep. of Germany .
1347991 2/1974 United Kingdom .

Primary Examiner—Alan Cohan
Attorney, Agent, or Firm—Eckert Seamans Cherin & Mellott

[57] ABSTRACT

An apparatus for regulating or controlling the outflow from a rain tank, a rain overflow, etc. contains a slide which, by a drive mechanism, can close the outlet line from the tank. The position of the slide is controlled by a control mechanism. The control mechanism is operated by the hydraulic oil of a hydraulic circuit having a hydraulic pump. The latter is driven by a turbine wheel, which is housed in a turbulence restrictor located downstream of the slide and which is rotated by the flow of the outflowing water.

24 Claims, 5 Drawing Sheets

APPARATUS FOR REGULATING AM OUTFLOW

BACKGROUND OF THE INVENTION

1. Field of the Invention

The invention relates to a method and an apparatus for regulating outflow, particularly from rain water tanks.

2. Prior Art

Rain water tanks are used to intermediately store the rain falling in the case of very sudden rainfall in such a way that watercourses are not endangered. It is virtually impossible to forecast heavy rain and large quantities of water are involved.

It has hitherto been conventional practice to restrict or constrict the outflow from rain water tanks, i.e. to provide devices which, in the case of a large opening, have a high flow resistance. For this purpose, inter alia, waste water restrictors with turbulence or vortex chambers are used, which operate without moving parts. They have large cross-sections, which are not very susceptible to blockages.

An example of such a waste water restrictor is known from German patent No. 26 43 029 and produces an outflow which increases roughly proportionally to the square root of the water level.

SUMMARY OF THE INVENTION

An object of the present invention is to offer a possibility of not only to restrict, but also to control or regulate the outflow from a rain water tank, so that the water quantity passing out per unit of time does not exceed a specific desired value, independently of the water level in the tank.

According to the invention this object is achieved.

This apparatus has important advantages. The regulation or control of a tank of this type is not necessary on a continuous basis, because heavy rain is relatively infrequent. However, as in the case of a cloud burst the water quantity can be very considerable within a very short time, a possibility should exist for ensuring that the regulating or control means can respond very rapidly. However, as both the control device and the mechanically driven slide require a certain time to react, the turbulence restrictor proposed as part of the apparatus according to the invention acts during the start of such a downpour as a conventional restrictor before the control system can come into operation. As a result the turbulence restrictor prevents an overflow. When operating the turbulence chamber a turbulence or vortex occurs therein, which is air-filled in its nucleus or core. Thus, the arrangement of the turbine wheel in the case of a turbulence restrictor is particularly favorable, because there is only a very limited risk of pollution or contamination of the turbine or its bearing. In addition, the turbine wheel located in the turbulence restrictor measures the actual flow of the water through the restrictor, so that the result of the control operation is independent of any backwash or damming back by the tail water.

In this context, a slide is understood to mean an element, which can vary the flow cross-section of the line between the substantially fully opened position and a position corresponding to a minimum cross-section and e.g. the term also covers an embodiment wherein the range of the slide covers a section of the flow cross-section.

A waste water restrictor with its turbine wheel is preferably positioned downstream of the slide, although this is not absolutely necessary. It is also possible to bring about a control if the slide is positioned downstream of the restrictor.

It is particularly advantageous if the outlet of the energy converter can be connected to the slide drive mechanism for the displacement thereof. As a result the apparatus according to the invention is made independent of external energy, so that no external energy connections are required.

The energy converter could constitute by a small generator, which converts the mechanical rotational energy of the turbine wheel into electric power, which is usable for operating the control mechanism.

However, according to a further development of the invention, it is particularly advantageous for the energy converter to have a hydraulic pump rotated by the turbine wheel and whose outlet line is connected to the control mechanism. Within a hydraulic system, such a hydraulic pump moves a hydraulic fluid, whose pressure and/or quantity can be used for operating the control mechanism. In particular, the hydraulic fluid can also be directly used for driving the slide drive mechanism.

According to a further development of the invention the control mechanism has a control element movable under the pressure of the hydraulic fluid. This control element is used for controlling the position of the slide through its drive mechanism. It can consist of any random control element, e.g. pressure elements and the like.

The invention particularly proposes that the control element is constructed as a valve slide cooperating with openings to connecting lines. The valve slide is displaced by the pressure of the hydraulic fluid and opens and closes openings, which lead into the corresponding parts of the drive unit for the slide and/or to the hydraulic pump.

According to a further development the control element is housed in a control block mechanically connected to the drive mechanism of the slide. This makes it possible to combine almost all the elements of the drive mechanism and the control mechanism into a single unit, so that it is only necessary to have two lines for a connection to the hydraulic pump.

According to a further development the hydraulic system containing the hydraulic pump has a storage tank, which is preferably sealed in airtight manner. As a result of the airtight seal, a closed system is provided, in which the hydraulic fluid does not change its characteristics under the influence of air. Security against running out is also provided, because a vacuum is formed in the system in the case of leaks.

According to a further development the control mechanism is connected via two hydraulic lines to the hydraulic pump. These lines can, e.g., be hoses. In this way the turbulence chamber can be easily opened without removing the control mechanism.

According to a further development, the control mechanism can be connected by in each case one line to the slide drive mechanism and to the storage tank.

The invention proposes that the outlet line of the pump is connected via a bypass valve having an adjustable cross-section to its inlet line. As a result of this bypass valve, part of the hydraulic fluid conveyed by the hydraulic pump is returned directly to the latter, so that only the remaining part is used for driving the slide and/or for operating the control mechanism. This offers the possibility of modifying the response of the control mechanism and therefore the desired outflow value through the size of the cross-section of the bypass valve compared with the other flow paths. If this takes place with the aid of a bypass valve with a continuously adjustable cross-section, the desired outflow value can be continuously adjusted with very simple means, e.g. a rotary knob.

According to a further development the control mechanism outlet leading to the slide drive mechanism has a check valve and a separately operable bypass. The check valve is intended to prevent a return flow of the hydraulic fluid used for closing the slide, while the separately operable bypass can be necessary for reopening the slide.

The line between the storage tank and the control mechanism can in particular be directly connected to the line between the control mechanism and the hydraulic pump.

It is possible that both the opening and the closing movement of the slide takes place with the aid of the pressure supplied by the hydraulic pump. However, it is particularly advantageous if the drive mechanism for the slide urges the latter into the open position. This action can e.g. be provided by a weight, but in particular a spring.

The invention also proposes that the drive mechanism for the slide has a synchronous cylinder with a piston, which is optionally connected by a piston rod to the slide. In a synchronous cylinder both cylinder inner spaces are filled with hydraulic fluid, which improves its easy action, even after long stoppage times. The suction and blowing out of air during operating strokes is avoided, so that there is no aging of the hydraulic fluid.

According to the invention the inner space of the cylinder acting in the slide closing direction is connected to the control mechanism by a line. The slide is closed by pressurized oil being pumped into its inner space. As soon as the pressure drops, the actuating means moves the slide in the opening direction again, so that as a result of the aforementioned line hydraulic fluid is moved back again.

According to a further development the inner space of the cylinder acting in the slide opening direction is connected by means of a line to the storage tank. Hydraulic fluid flows into the inner space through said line as soon as the opening action of the drive opens the slide.

It is particularly advantageous if the storage tank is located in the extension of the drive cylinder and has the spring for pre-urging the drive mechanism. The control block can be positioned between the drive cylinder and the storage tank. As a result the complete drive and control mechanism is constructed as a single unit, which is consequently compact and need only be connected to the oil pump by two lines.

The invention proposes that the hydraulic fluid is a biologically harmless and in particular biodegradable oil, e.g. rapeseed oil.

The invention also proposes that the turbine wheel is rotatable about a vertical axis in the top of the horizontally arranged turbulence chamber and is mounted on a shaft passing through the cover. Thus, only the marginal area of the turbine wheel is affected by the vortex core of the waste water flow, whereas the actual mounting remains in a part essentially not affected by the water.

In order to vary the desired outflow, a replaceable diaphragm can be fitted to the outlet port of the turbulence restrictor. By replacing one diaphragm by another having a different internal diameter, it is possible to vary the desired outflow. The desired value can be varied within wide limits by a combination of the outlet diaphragm and varying the bypass cross-section.

In order to provide a particularly easy-action regulation or control, the invention proposes using a slide, which has a casing formed from two PVC chuck plates arranged in sandwich-like manner between two high-grade steel plates with in each case one opening. One slide plate can be inserted laterally, i.e. particularly from above, into a pocket-like recess, which is formed in one of the two chuck plates. The chuck plates can be very accurately manufactured on numerically controlled machines, while high-grade steel plates are commercially available. Such a slide only requires very limited forces for displacing the slide plate, so that the control system can still operate in the case of very small through-flows. Therefor the apparatus according to the invention can also control very small outflows.

The slide plate can in particular be sealed with respect to the casing by in each case one elastically mounted PTFE seal or packing engaging on the wide side of the slide. The slide casing can be inserted between two flanges to be fixed to one another of a pipeline and in this case O-rings can be used for sealing purposes.

The invention also proposes a method of controlling outflow. In particular, the slide can be urged in the direction of its opened position, more particularly by a spring. Thus, in the case of a failure of the control system or its drive, the slide is opened and the tank has a drain, which is restricted by the turbulence restrictor.

In particular the energy for actuating the slide can come from the control loop. Therefore the method is independent of external energy. Part of the fluid flow supplied by the hydraulic pump can, according to a further development of the invention, be returned by a bypass to the pump inlet. This makes it possible to modify both the response of the control mechanism and the desired outflow.

The invention proposes the use of a biodegradable rapeseed oil as the hydraulic fluid, so that there is no contamination of the environment even if the system is destroyed.

In this way the invention provides a regulating or control possibility, which controls very small outflows, has a robust construction, is insensitive to the damming back of tail water and which is not susceptible to slide blockages. The apparatus has a very favorable control characteristic, which on the one hand very rapidly responds and on the other is stable. The apparatus can be set to different desired values, even following installation and the most favorable desired value can also be determined after installation. The apparatus has very favorable space requirements and a low working height and can even be used in the case of backwashes. It is extremely reliable and has a long life.

BRIEF DESCRIPTION OF THE DRAWINGS

Further features, details and advantages of the invention can be gathered from the claims, the following description and preferred embodiments of the invention described hereinafter relative to the drawings, wherein are shown:

DETAILED DESCRIPTION OF THE PREFERRED EMBODIMENTS

Figure 1:
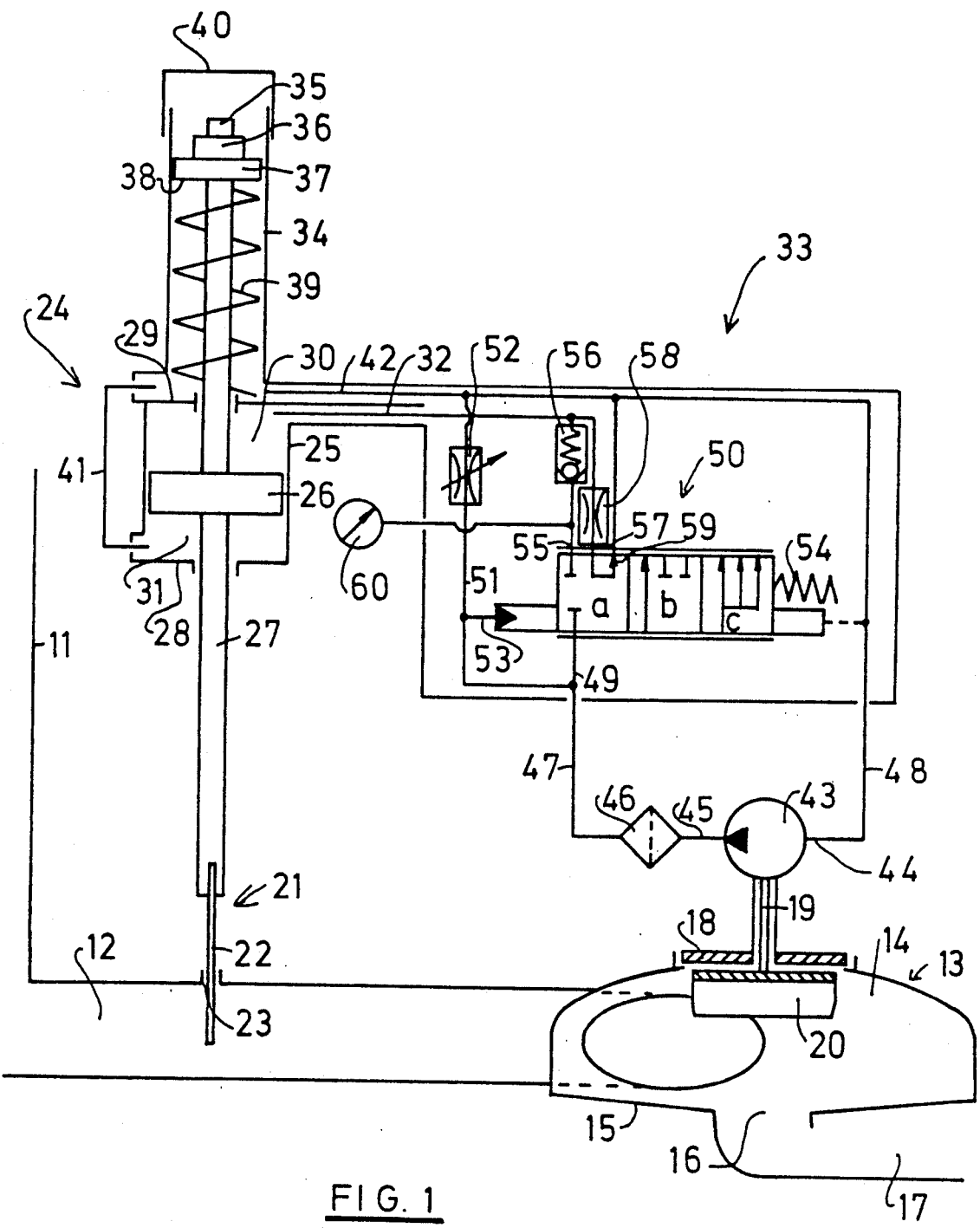
FIG. 1: Diagrammatically a control mechanism proposed by the invention.

In FIG. 1 an outlet line 12 is located at the end of a rainwater tank, whose boundary wall is 11. The water flows out of the rain tank from said line arranged in the lower area. The outlet line 12 issues roughly tangentially into a waste water restrictor 13, which is constructed as a turbulence restrictor and contains a turbulence chamber 14. From the waste water restrictor 13 the water flows out of an outlet port 16 positioned centrally in bottom 15. From said port the water flows on through a line 17. The waste water restrictor 13 is constructed as a flat, horizontally positioned turbulence restrictor and in the represented embodiment has a flat, slightly conical bottom 15, while its top surface is rounded. The waste water restrictor 13 is closed by a cover 18, which seals a centrally arranged opening in the top surface. The cover 18 can be opened, e.g. hinged open. In the cover 18 is mounted a shaft 19, to whose end projecting into the turbulence chamber 14 is fixed in non-rotary manner a turbine wheel 20, which can therefore rotate about the axis of the vertically directed shaft 19. It projects only slightly from the top hanging in the turbulence chamber 14.

A slide 21 is inserted in the outlet line 12 between the rain tank and the waste water restrictor 13 and said slide has a slide plate 22. The latter can be introduced through a sealed opening 23 into line 12 until it closes the latter. In the represented embodiment the opening 23 is located on the top of the line 12 and enables the slide plate 22 to be inserted from the top. It is obviously also possible to insert the slide plate 22 from other sides. However, the represented embodiment is preferred for space-saving reasons.

The slide 21 has a drive mechanism 24 with the aid of which the slide plate 22 can be inserted in line 12 and also removed therefrom again. The drive mechanism 24 contains a sealed cylinder 25 in whose interior is displaceably arranged a piston 26. Piston 26 is fixed to a piston rod 27, which passes through the piston 26 and on either side of the latter is sealingly passed through the particular end wall 28, 29 of cylinder 25. Thus, a cylinder inner space 30, 31 is formed both above and below the piston 26. If pressure or hydraulic fluid is pumped into the inner space 30 of cylinder 24 located above piston 26, then the latter is moved downwards and slide plate 22 is inserted in line 12, i.e. the slide moves in the closing direction.

A control mechanism 33 is connected by means of a line 32 to the inner space 30 of cylinder 25 acting in the closing direction of slide 21. This control mechanism is constructed in such a way that it can introduce hydraulic fluid through line 32 into inner space 30 in order to close the slide 21. For opening slide 21, fluid can pass through line 32 out of the inner space 30 to the control mechanism 33.

In the axial extension of cylinder 25 is provided a further cylindrical container 34, in which is arranged the upper end 35 of piston rod 27. On the upper end 35 of piston rod 27 is formed a thread, onto which is screwed a nut 36. Below the nut 36 is retained a plate 37 engaging thereon and between whose underside 38 and the end wall 29 extends a compression spring 39, so that the latter forces plate 37 and therefore the complete piston rod 27 upwards. The bias of compression spring 39 can be adjusted with nut 36. In the vicinity of its upper end container 34 is closed with the aid of a cover 40, which can be connected in airtight manner to the upper end of container 34. Container 34 is connected by means of a compensating line 41 to the inner space 31 of cylinder 25 located between slide 21 and piston 26. The container 34 is at least partly filled with hydraulic fluid as are the two inner spaces 30, 31 of the cylinder 25. Container 34 acting as a storage tank is connected via a further line 42 to the control mechanism 33.

At the upper end of shaft 19 is provided a hydraulic pump 43 which, if the turbine wheel 20 rotates, is driven. It is preferably a low pressure internal gear pump. Pump 43 has an inlet 44 and an outlet 45. Thus, on operating the pump 43, it pumps hydraulic fluid from its inlet 44 to its outlet. A filter 46, which filters the pumped hydraulic fluid is located behind the outlet 45 of pump 43. Hydraulic pump 43 is connected to the control mechanism 33 by means of a further-extending line 47. Inlet 44 of hydraulic pump 43 is also connected by a line 48 to the control mechanism 33.

Within the control mechanism 33 the line from the outlet 45 of hydraulic pump 43 is connected to an inlet 49 of a valve slide 50. One part of the hydraulic oil from the hydraulic pump 43 is returned via a branched line 51 into the return line 48 leading from the control mechanism 33 to the hydraulic pump 43. This branch line 51 contains a bypass valve 52, whose flow cross-section can preferably be continuously modified. A further branch 53 leads from branch line 51 to valve slide 50. The pressure there is used in order to move the valve slide 50 counter to the tension of a return spring 54 out of the starting position shown in FIG. 1.

The valve slide 50 has three outlet connections, whereof the outlet connection 55 leads via a check valve 56 to the line 32 in the inner space 30 of cylinder 25. A second outlet 57 leads via a constricted bypass 58 past the check valve 56 into the line 32. A third outlet 59 leads into the return line 48 to the hydraulic pump 43.

The outlet 55 leading to the check valve 56 is connected by a further line to a manometer 60, with the aid of which it is possible to check the control mechanism 33.

The control valve containing the valve slide 50 has three possible positions, indicated as a, b and c in the drawing. The return spring 54 presses the valve slide 50 into the starting position shown in FIG. 1, in which the inner space 30 acting in the closing direction of slide 21 is connected via line 32, bypass 58 and outlet 59 of valve slide 50 to the return line 48 and to line 42 of the storage tank 34. In this position hydraulic fluid can flow out of the upper inner space 30 of cylinder 25, so that the spring 39 can move upwards piston 26. Hydraulic fluid passes out of the storage tank 34 via line 41 into the lower inner space 31.

Figure 2:
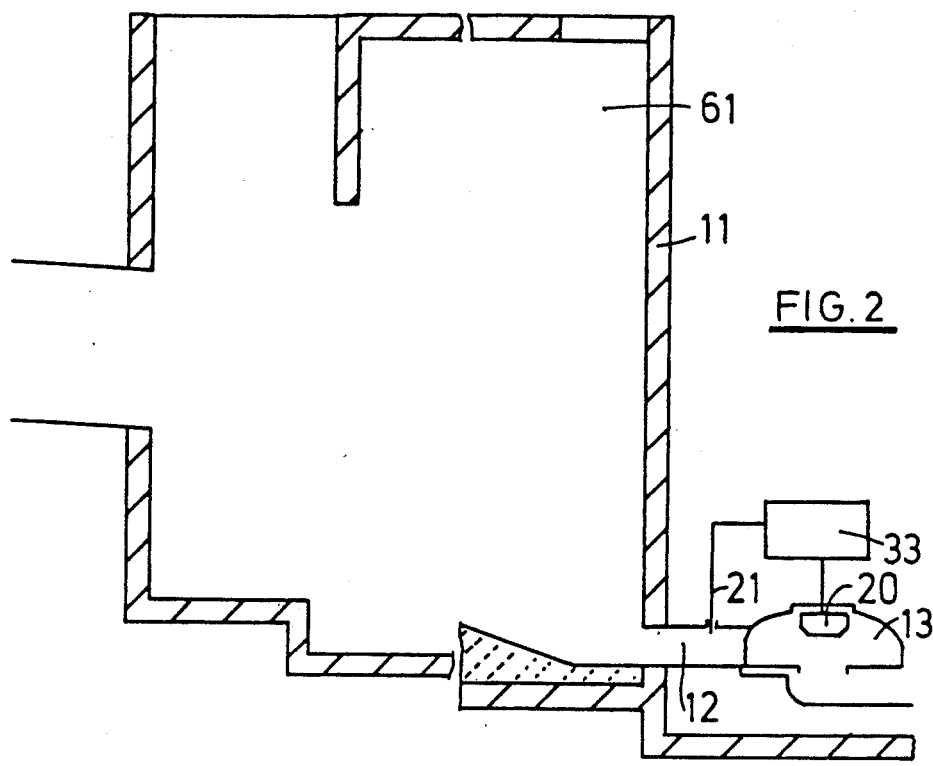
FIG. 2: The arrangement of a control mechanism on a rain water tank outlet.

FIG. 2 shows the arrangement of the apparatus shown in FIG. 1 at the outlet of a rain tank 61. With the aid of the apparatus constituted by slide 21, waste water restrictor 13 and control mechanism 33, the water quantity flowing out of tank 61 is to be kept constant. This obviously only applies in a range in which, without the apparatus, the outflowing water quantity would be greater than the desired outflow. Without the inventive apparatus the outflowing water quantity per unit of time would be a function of the water level in the rain tank. Therefore in FIG. 3 the outflowing water quantity per unit of time is plotted on the abscissa and the water level on the ordinate.

As soon as the water level in the rain tank 61 starts to rise, the water quantity increases in accordance with the lower branch of the curve 62. As from a specific water quantity, the turbine wheel 20 starts to rotate. A flushing point 63 visible in FIG. 3 now occurs with the further rising water level until the control system comes into action. During the lower curve branch 62 slide 21 is completely open, which is made possible by valve position a in FIG. 1. As soon as the turbine wheel 20 starts to rotate, the hydraulic pump 43 pumps fluid into the control mechanism 33 which, on reaching a specific value, moves the valve slide 50 out of position a into position b. In position b inlet 49 of valve slide 50 is connected to outlet 55, so that the hydraulic fluid not passed away via bypass 52 passes via line 32 into the upper inner space 30 of cylinder 25 and this pressure closes the slide. This closing movement is continued until the quantity of the hydraulic fluid supplied by the hydraulic pump 43 is no longer adequate for keeping the slide in position b. It then returns to position a, whereupon the spring 39 again attempts to open the slide 21. In the diagrammatic representation of FIG. 1 it is consequently a two-point control system, in which the valve slide 50 is moved backwards and forwards between the two positions a and b. As a result of its much larger surface area, the piston 26 is able to integrate this movement, so that in the case of correspondingly rapid movements of the valve slide 50, slide 21 performs no movement and instead remains in a central closure position.

In the case of a corresponding construction of the valve slide 50, it is also obviously possible to carry out a continual control.

Figure 3:
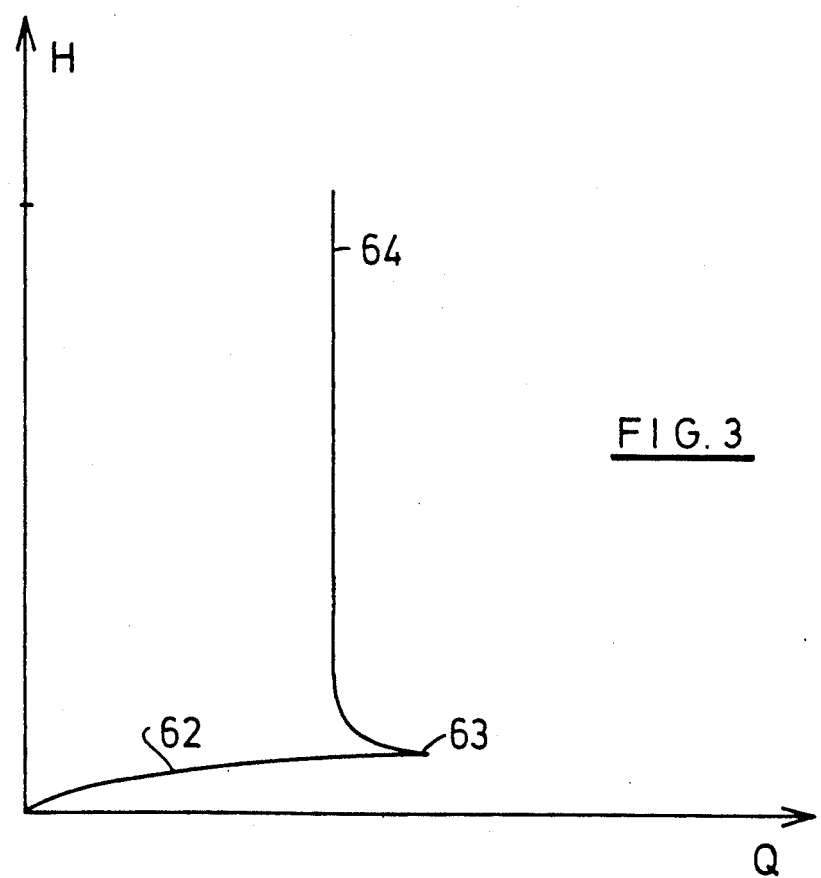
FIG. 3: The control characteristic occurring in the case of FIG. 2.

This control case, i.e. the changing between positions a and b of valve slide 50, is represented by the upper curve branch 64 in FIG. 3. During trials of the invention, it was found that a very constant outflow can be obtained, the response speed being high and the stability of the control loop good.

Figure 4:
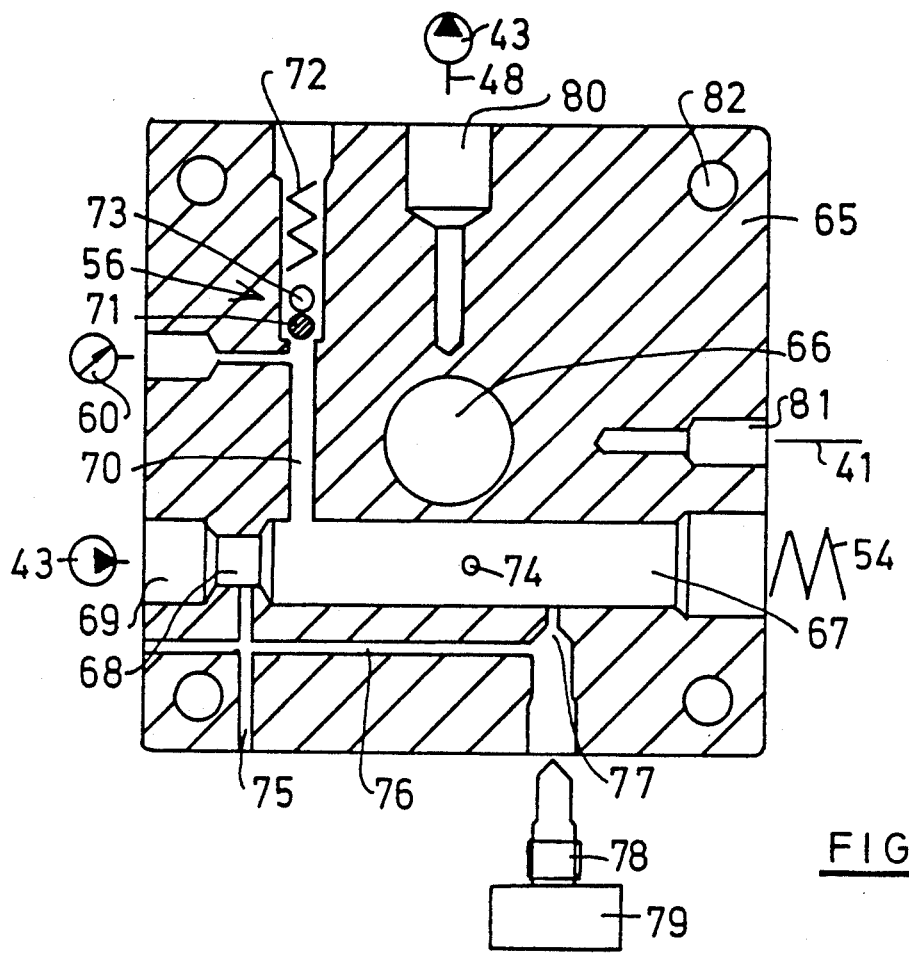
FIG. 4: A section through a control block receiving the essential elements of the control mechanism.

FIG. 4 shows an actual possibility for constructing the control mechanism 33. Almost all the elements of the control mechanism 33 are housed in a metallic, one-piece, parallelepipedic control block 65. The latter forms the upper end wall 29 of cylinder 25 diagrammatically shown in FIG. 1, i.e. the partition between the drive cylinder 25 for slide 21 and storage tank 34. When using as a basis the arrangement according to FIG. 1, FIG. 4 shows a cross-section through the control block 65, the viewing direction being from top to bottom. In the center of the control block 65 is provided a passage opening 66 for the part of the piston rod 27 positioned above piston 26. A transversely directed bore for forming a valve control chamber 67 is positioned laterally. In said valve control chamber 67 is inserted the spindle-like valve slide 50, which is not shown in order not to overburden the drawing. The valve inner space passes via a reduced diameter bore 68 into a connection 69, into which can be screwed a hose connected to the hydraulic pump 43. The movement of the valve slide to the left, which is brought about by the compression spring 54, is limited by the reduced diameter bore 68.

A short distance before this end position, a bore 70 passes out of the valve control chamber 67 and in it is formed the check valve 56. The latter is formed by a ball 71, which is pressed by a spring 72 onto a valve seat. From bore 70 a bore 73 parallel to the passage opening 66 passes downwards, i.e. into the inner space 30 of cylinder 25 located below control block 65. This bore 73 corresponds to part of the line 32 in FIG. 1. The line leading from the inner space 30 via line 32 and bypass 58 to the outlet 57 of valve slide 50 is formed by a bore 74 issuing directly into the valve control chamber 67. Manometer 60 can be connected directly upstream of check valve 56 via a connection.

The bypass valve 52 is formed by two crossing low or deep bores 75, 76 and a needle valve 77, which leads into the valve control chamber 67 and can be opened and closed with the aid of an adjusting screw provided with a thread 78. The screw has a rotary knob 79, with the aid of which it is possible to very finely adjust the cross-section of needle valve 77. The outer ends of the deep bores 75, 76 are closed, so that a bypass is formed between the connection 69 into which the hydraulic fluid is fed, and the back of the valve slide. The return to pump 43 takes place by a bore issuing in the valve control chamber 67 and which is not visible, because it is located above the sectional plane. From there the hydraulic fluid passes via storage tank 34 through a further bore located above the sectional plane into connection 80, from which the hydraulic fluid is returned via line 48 to pump 43.

The line 41 leading from the storage tank 34 to the lower inner space 31 of cylinder 25 is connected to the connection 81 to the right in FIG. 4. This connection is connected via a further bore located above the sectional plane to the storage tank 34.

All the connections and valve ports can be formed by drilling and thread cutting. All these operations can take place from the outside, so that the control block 65 can be very simply manufactured from an integral material. The bores 82 located at the corners are used for screwing the control block to the cylinder 25 and the storage tank 34.

Figure 5:
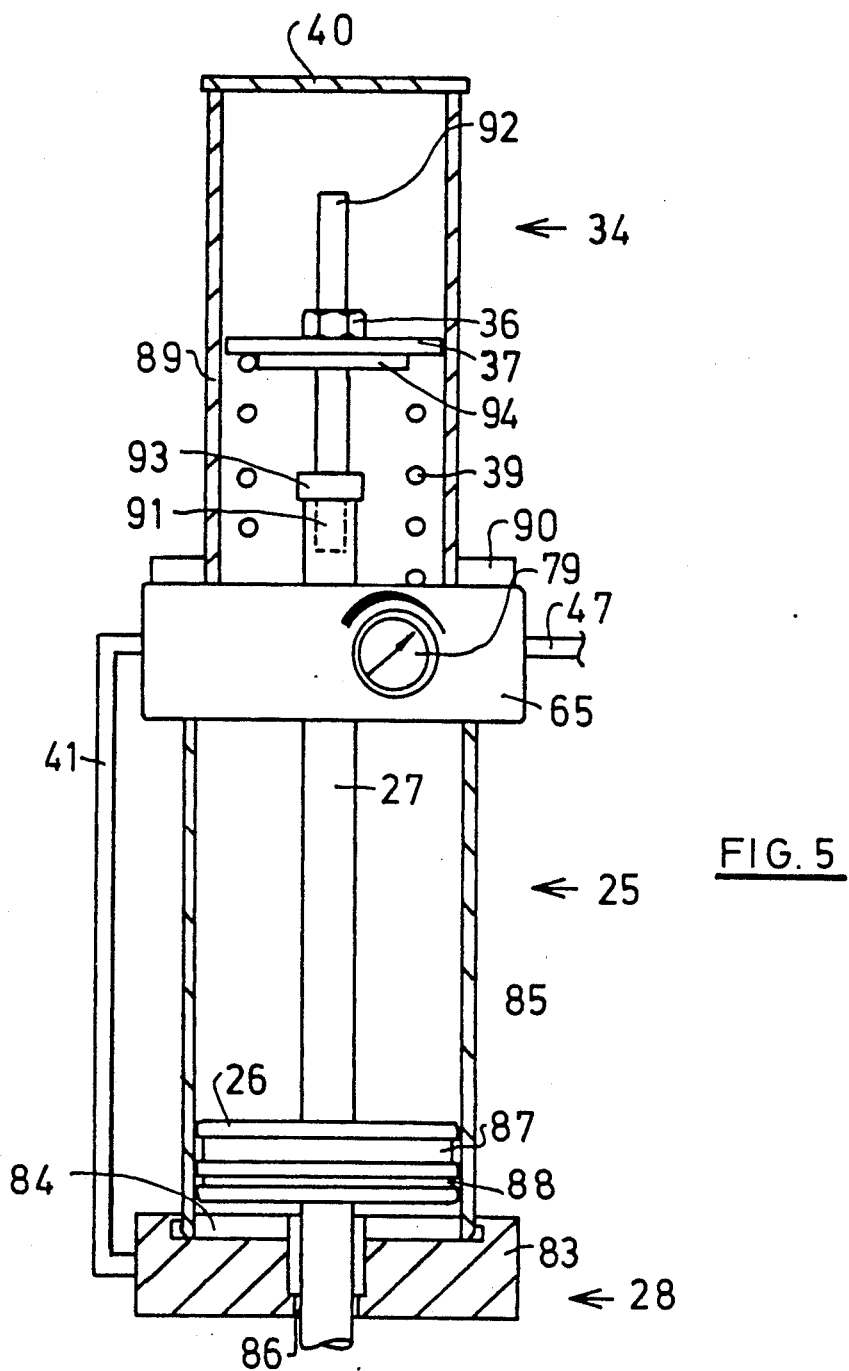
FIG. 5: Diagrammatically a section through a drive mechanism for a slide.

FIG. 5 shows the assembled state. The lower end wall 28 of cylinder 25 is formed by a metal plate 83, which is provided in its top surface with a recess 84. A metal pipe 85, whose inside is honed, engages along its circumference on the edge of the recess 84 and is inserted in the latter. The metal plate 83 has a central passage opening 86, in which is inserted and sealed the piston rod 27. The sealed piston 26 is fixed to the piston rod 27. The upper end of the piston rod 27 projects through the central passage opening 66 of control block 65. The control block 65 has on its underside a recess similar to recess 84. The metal plate 83 and the control block 65 are fixed against one another by four draw rods engaging on the corners and which are not shown in order not to overburden the drawing. These draw rods pass through the holes 82 in the control block 65 and can be simultaneously used for fixing the storage tank above the control block 65. A further cylindrical pipe 89 is fixed to the top of the control block 65 and is welded in the vicinity of its lower end to all-round flanges 90. The pipe 89 is e.g. fixed to the draw rods with said flanges 90.

In the upper end of piston rod 27 is provided a bore 91, which is threaded. Into the thread is screwed a threaded rod 92 and is fixed with the aid of a nut 93 engaging on the upper end of the piston rod 27. Plate 37 is engaged over the threaded rod 92 and on its underside there is a step formed by a second plate 94. The upper end of the compression spring 39 engages on this step. The upward displacement of the plates 37 and 94 is prevented by the nut 36, with the aid of which it is possible to adjust the bias of spring 39. The end of the piston rod 27 projecting upwards out of the control block 65 consequently moves in the storage tank 34, which is partly filled by hydraulic fluid.

Towards the top the pipe 89 is sealed with the aid of a cover 40, which is fitted in airtight manner to the upper end of the pipe 89, but details are not shown.

The unit shown in FIG. 5 contains both the drive mechanism for the slide 21 and the control mechanism 33. This unit is connected by means of lines 47 and 48 to the hydraulic pump 43. Thus, the drive and control mechanism has a simple construction and can be easily maintained.

Figure 6:
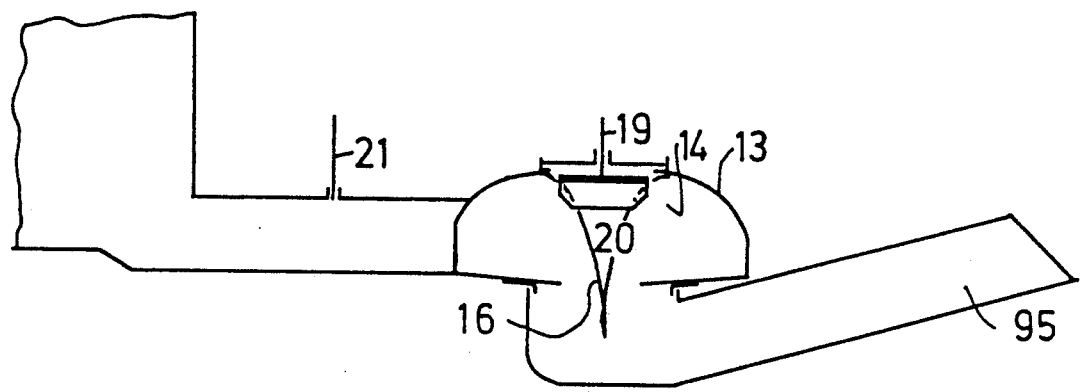
FIG. 6: The arrangement with a siphon-equipped turbulence restrictor.

FIG. 6 shows the arrangement of an apparatus according to the invention for the case that damming back or backwash from tail water is likely. Below the outlet port 16 of the waste water 13 a siphon-equipped line 95 slopes upwards. The flow produced in the turbulence chamber 14 is so powerful, that also heavy objects can be conveyed out of line 95. Here again the apparatus according to the invention operates in a completely satisfactory manner, because the turbine wheel 20 measures the actual through-flow quantity and consequently the result is not dependent on a pressure difference between the inlet and outlet side of the apparatus.

The apparatus according to the invention not only has a favorable control behaviour, but is also able to automatically remove faults. One of these faults is an overload, i.e. the presence of a hard object in the vicinity of the slide, so that the latter can no longer be closed.

In this case the pressure of the hydraulic fluid in line 47 can no longer be used for closing the slide, because the latter cannot move on. This case e.g. occurs if a stone is located in the vicinity of the slide and against whose top surface strikes the slide plate 22. The pressure rise in line 47 or 51 then leads to the valve slide 50 according to FIG. 1 being moved into its position c. In this case the hydraulic oil at inlet 49 can be pumped via outlet 59 into the pump return line 48. Thus, there is no overloading of any parts of the control circuit.

Another disturbance case is the blockage of the closed slide through objects in line 12. As soon as the slide 21 becomes blocked, the flow downstream of slide 21 stops, so that the turbine wheel 20 stops. As a result of the position a of the valve slide 50, this leads to the spring 39 relatively rapidly opening the slide. The slide is opened until the turbine wheel is again given a correspondingly rapid rotation. However, this only takes place when the flow has flushed away the slide blockage. When the slide is completely open, there is once again a flushing tip similar to that in FIG. 3, so that a blockage can be very rapidly and thoroughly eliminated. Therefore the apparatus according to the invention permits an automatic removal of problems of all types.

Figure 7:
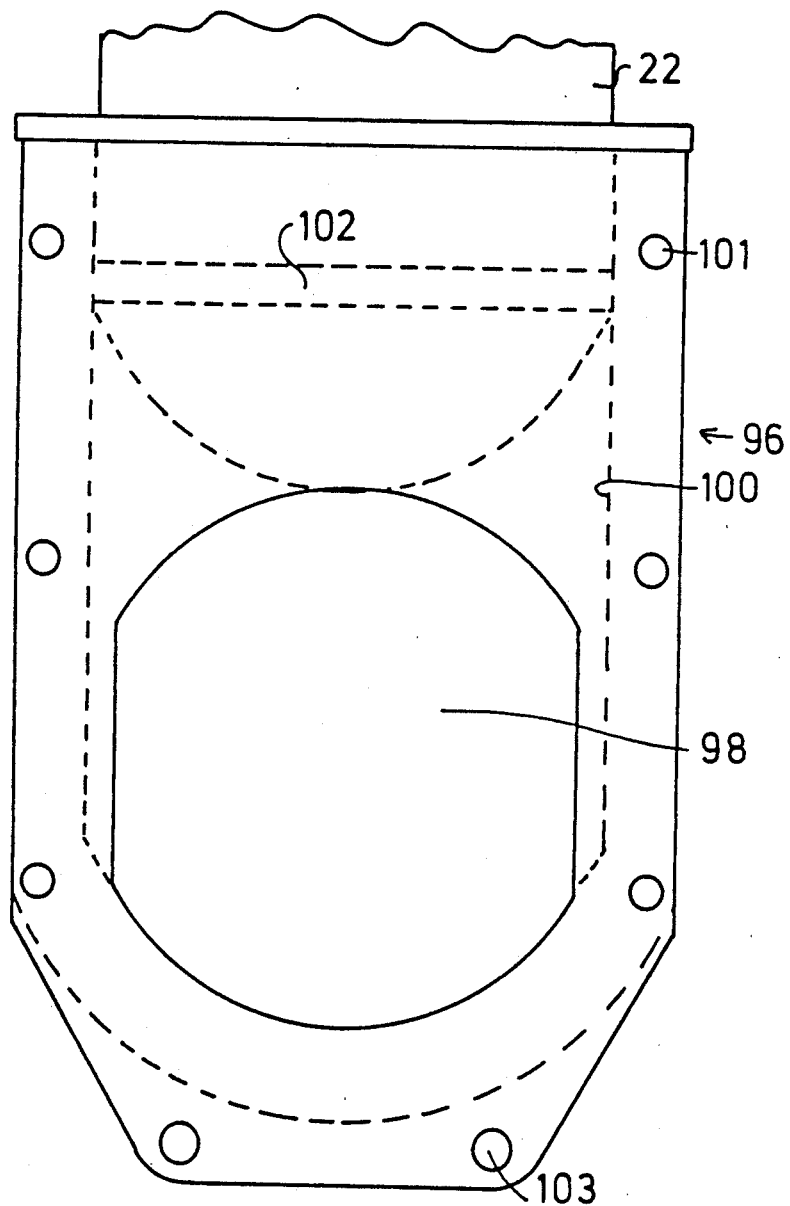
FIG. 7: A plan view of a slide.
Figure 8:
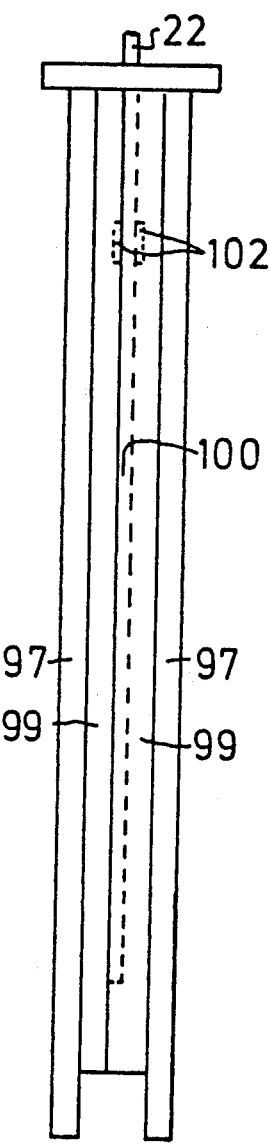
FIG. 8: The side view of the slide of FIG. 7 from one edge.

FIGS. 7 and 8 show a possible construction of a slide 21. The latter contains a slide casing 96, which is formed from two high-grade steel outer plates 97. Both plates 97 have an identical construction and a central opening 98, which corresponds to the passage opening of the slide. Between the two plates 97 two PVC chuck plates 99 are inserted in sandwich-like manner, whereof one has a recess 100 indicated in broken line form in FIGS. 7 and 8. The in all four plates are screwed together, the screws being inserted through corresponding openings 101 and tightened. Into the recess 100 the slide plate 22 is inserted from above in FIGS. 7 and 8, i.e. laterally and the dimensions of this plate correspond to the recess 100. Chuck plate 99 and slide plate 22 are so precisely machined with the aid of numerically controlled machine tools, that a PTFE packing located in a recess 102 is adequate for sealing purposes and seals the two ends of the slide plate 22. As a result of the small tolerances and the high accuracy construction only limited forces are required for sliding the slide plate 22.

The slide casing 96 shown in FIGS. 7 and 8 is inserted between two pipe flanges, which are pressed together by screws. The seal between the flanges and the casing 96 can be provided by O-rings. The screws pressing the two flanges together can be moved past the casing 96 or, as is possible in the lower area, can be passed through openings 103 in the high-grade steel plates 97.

What is claimed is:

1. An apparatus for regulating and/or controlling the outflow from rain water tanks, overflows or the like, comprising a slide valve, which is inserted in an outlet line of the water tank or the like and has a drive mechanism for varying its cross section;
   a waste water restrictor containing a turbulence chamber in which a vortex is created by the flowing water;
   a turbine wheel arranged in rotary manner in the turbulence chamber and which may be driven by the flowing water;
   an energy converter driven by the turbine wheel;
   the output of the energy converter being used for operating a control mechanism, which controls via the drive mechanism the position of the slide valve.

2. A apparatus according to claim 1, wherein the energy converter outlet is connectable with the drive mechanism of the slide for the displacement thereof.

3. An apparatus according to claims 1 or 2, wherein the energy converter comprising a hydraulic system containing hydraulic fluid and a hydraulic pump rotated by the turbine wheel and whose outlet line is connected to the control mechanism which has a control element moveable under the pressure of the hydraulic fluid.

4. An apparatus according to claim 3, wherein the control element controls the flow of the hydraulic fluid to the drive mechanism of the slide.

5. An apparatus according to claim 3, wherein the control element in constructed as a valve slide cooperating with openings to connecting lines.

6. An apparatus according to claim 3, wherein the control element is housed in a control block mechanically connected to the drive mechanism of the slide.

7. An apparatus according to claim 3, wherein the hydraulic system containing the pump has a storage tank, which is sealed in airtight manner.

8. An apparatus according to claim 3, wherein the control mechanism is connected via two lines to the hydraulic pump and is connected via in each case one line to the drive mechanism for the slide valve and a storage tank.

9. An apparatus according to claim 3, wherein the outlet line of the pump is connected via a bypass valve with an adjustable cross-section to the inlet line of the pump.

10. An apparatus according to claim 3, wherein the outlet of the control mechanism leading to the drive mechanism for the slide valve has a check valve and a separately operable bypass.

11. An apparatus according to claim 7, wherein the line between the storage tank and the control mechanism is directly connected to the line between the latter and the hydraulic pump.

12. An apparatus according to claim 1, wherein the drive mechanism for the slide valve urges same into the open position, by a spring.

13. An apparatus according to claim 1, wherein the drive mechanism for the slide valve has a symmetrical cylinder with a piston, which is connected to the slide valve, the inner space of the cylinder acting in the closing direction of slide valve being connected to the control mechanism via a line and the inner space of the cylinder acting in the opening direction of slide valve being connected by a line to a storage tank.

14. An apparatus according to claim 13, wherein the storage tank is arranged in the extension of the symmetrical cylinder and contains the urging spring and the control block is located between the drive cylinder and the storage tank.

15. An apparatus according to claim 3, wherein the hydraulic fluid is a biodegradable oil.

16. An apparatus according to claim 1, wherein the turbine wheel is rotatable about a vertical axis in the top of a horizontally positioned turbulence chamber and is mounted on a shaft passing through the cover.

17. An apparatus according to claim 1, wherein the desired outflow can be modified by an outlet diaphragm at the outlet of the turbulence chamber.

18. An apparatus according to claim 1, wherein the slide valve has a casing formed from two high-grade steel plates with in each case one opening and PVC chuck plates inserted in sandwich-like manner between the plates and in which said casing has a pocket-like recess formed in one chuck plate and into which one slide plate can be laterally inserted.

19. An apparatus according to claim 18, wherein the slide plate is sealed with respect to the casing by an elastically mounted PTFE packing engaging on the wide side of the slide plate.

20. An apparatus according to claim 18, wherein the slide casing can be inserted between two flanges of a pipeline to be fixed to one another.

21. An apparatus according to claim 3, wherein the hydraulic system containing the pump has a storage tank.

22. An apparatus according to claim 1, wherein the drive mechanism for the slide valve urges same into the open position.

23. An apparatus according to claim 21, wherein the storage tank is arranged in the extension of the drive cylinder.

24. An apparatus according to claim 15, wherein the hydraulic fluid comprises rapeseed oil.

* * * * *

UNITED STATES PATENT AND TRADEMARK OFFICE
CERTIFICATE OF CORRECTION

PATENT NO.   : 5,044,394

DATED        : September 3, 1991

INVENTOR(S) : Hansjorg Brombach

It is certified that error appears in the above-identified patent and that said Letters Patent is hereby corrected as shown below:

Title page, item [54], and column 1, line 1, should read --APPARATUS FOR REGULATING AN OUTFLOW--.

Column 2, line 12, delete "by".

Signed and Sealed this

Fourth Day of May, 1993

Attest:

MICHAEL K. KIRK

*Attesting Officer*   Acting Commissioner of Patents and Trademarks